Nov. 16, 1943. T. A. BOWERS 2,334,243
PROCESS FOR PISTON RINGS
Filed July 17, 1941
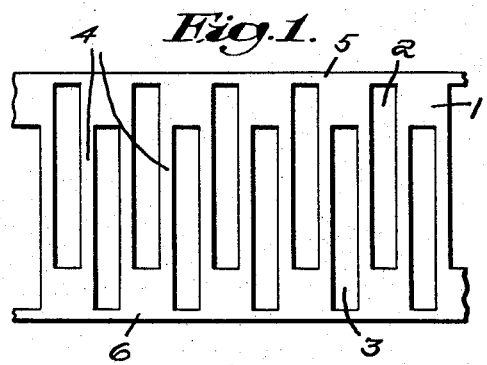
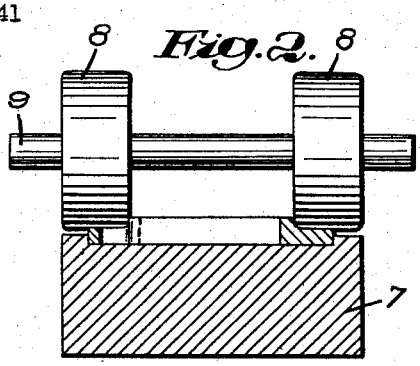
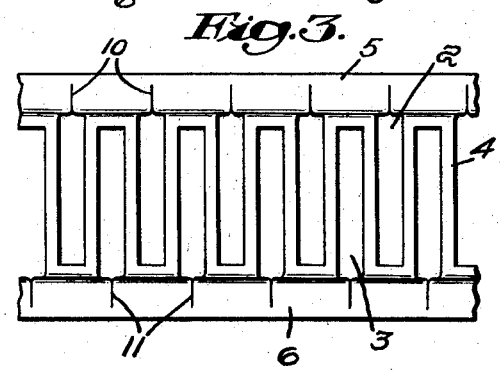
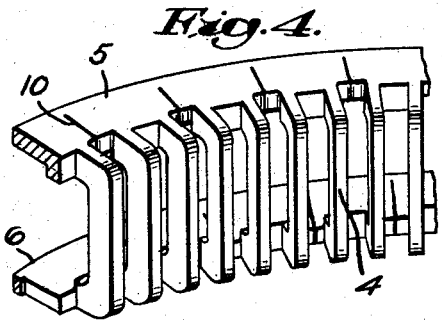
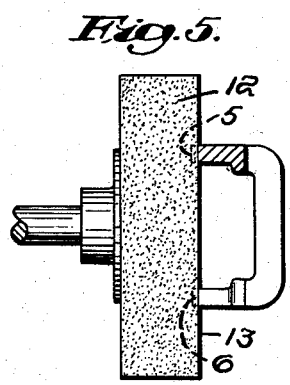
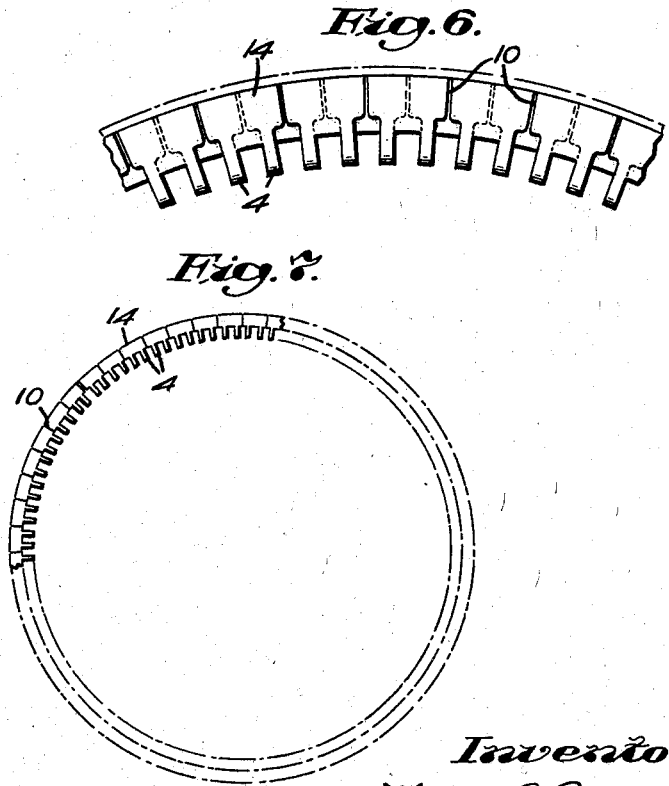
Inventor:
Thomas A. Bowers
by
Attorney Patented Nov. 16, 1943

2,334,243

UNITED STATES PATENT OFFICE 2,334,243

PROCESS FOR PISTON RINGS

Thomas A. Bowers, Mattapoisett, Mass., assignor to Power Research Corporation, Boston, Mass., a corporation of Massachusetts Application July 17, 1941, Serial No. 402,763

7 Claims. (Cl. 29—156.6)

This invention relates to piston rings and is a continuation in part of my copending application Ser. No. 354,839, filed August 30, 1940, and now Pat. No. 2,311,731, Feb. 23, 1943.

It is an object of the invention to improve methods of making piston rings and to devise novel cutting and forming operations in connection with making piston rings from sheet metal. Another object is to provide a flexible sheet metal piston ring having improved surfaces for metering oil on a cylinder wall, and other improvements. Still other objects are to provide methods of making piston rings which are adapted to be carried out by tool machinery, and which generally are simple, cheap, and efficient.

The nature of the invention and its objects will be more fully understood from the following description of the drawing and discussion relating thereto.

In the accompanying drawing:

Fig. 1 is a fragmentary plan view illustrating a step in the method of the invention;

Fig. 2 is a view in elevation and partial cross section illustrating a further step in the method referred to;

Fig. 3 is a fragmentary plan view illustrating a strip of piston ring material in a partially formed state resulting from the operation indicated in Fig. 2;

Fig. 4 is a fragmentary perspective view illustrating still another step in the method;

Figs. 5 and 6 are views illustrating still another step in the method; and

Fig. 7 is a plan view of a finished ring.

In the construction shown in Figs. 1-7 inclusive, numeral 1 indicates a strip of sheet material employed in making the ring of the invention. The strip is of a resilient character. It may, for example, be spring steel, an alloy, or other suitable metal.

In my earlier application above noted, I have described a method of making a piston ring in which a strip of resilient sheet metal of the character indicated is formed with transversely disposed overlapping openings, and thereafter folded longitudinally of itself to provide a member of substantially U-shaped cross section which, in turn, is bent into a circular form to constitute a piston ring. The edges of the strip are spaced apart to constitute oil scraping portions for the ring and the overlapping openings define circumferentially movable segments at both upper and lower sides of the ring, thereby imparting flexibility.

According to the present invention, I provide a method of making a piston ring of a generally similar type in which the steps of cutting and bending of the earlier method are modified by the inclusion of novel forming and grinding operations, which are adapted to facilitate the earlier method, and to impart improved structural features.

Referring in detail to Figs. 1-7 inclusive, I have illustrated a preferred method of the invention, in which the strip of resilient sheet metal 1 is formed, by some suitable means as punching, with slots 2 and 3 extending transversely of the strip in spaced-apart relation to leave intermediate portions of the strip, hereinafter referred to as webs or connecting portions 4. The slots 2 extend beyond the slots 3 along one edge of the strip 1, while the slots 3 extend beyond the slots 2 at an opposite edge of the strip Fig. 1).

The punched strip is subjected to a forming operation as for example rolling, which thins the edges 5 and 6 of the strip 1. This operation has been diagrammatically illustrated in Figs. 2 and 3, in which a base 7 is employed to support the strip 1 and rolls 8, mounted in spaced relation on a shaft 9, are passed over the edges of the strip.

The rolling operation provides a strip as shown in Fig. 3, in which the edges 5 and 6 occur with a thickness less than the thickness of the mid-portions of the strip, including the connecting portions 4. The metal along the edges of the strip becomes flowed and those portions of the metal adjacent the extremities of the openings 2 and 3, along the edges of the strip, become squeezed together, partially closing the slots and forming relatively smaller openings or interstices 10 and 11.

The rolled strip is bent along lines of bending which intersect the connecting portions 4 so as to arrange the edges of the strip in substantially parallel spaced-apart relation, and thereafter bent into a generally circular form to form a piston ring body. The bending operations noted may be carried out separately of one another or simultaneously. The latter procedure is preferable and may be effected by passing the strip, in a flat state, through a pair of complementary rotary dies which are formed with a generally U-shaped cross section over which the strip may be bent.

I may also desire to apply pressure to the web portions 4 in a direction longitudinally of the strip to thin these portions in the manner illustrated in Fig. 4. This may be done, for example, by introducing a series of plates or teeth, disposed between the connecting portions at right angles to the plane of the strip, and then forcing the plates together under pressure. In a circular form of the strip these webs are thus reformed to present a radial width which exceeds their circumferential width.

The ring body obtained by the steps noted in Figs. 1-3 inclusive is supported in some suitable base, as for example an annular block, and subjected to a grinding operation, as diagrammatically illustrated in Fig. 5. A grinding wheel 12, having a flat face 13, may be employed for this purpose. The ring is forced against the face 13 of a rotating grinding wheel which removes those portions of the strip between the edges 5 and 6 and the extremities of the relatively smaller openings 10 and 11. There are thereby formed a plurality of separated segments 14. The ring is preferably stretched a slight amount to widen the openings or interstices 10 and 11, and the ring is hardened in this position. The spaced-apart arrangement of the segments 14 provides for the segments being circumferentially movable and thereby developing flexibility. Other grinding, sizing and polishing operations may be resorted to, to provide a finished ring as shown in Fig. 7.

An important feature of the method of the invention consists in punching overlapping slots within the edges of a strip of piston ring material, and then flowing the metal along the edges of the strip to partially close the punched openings together so that relatively smaller openings or interstices are obtained throughout portions of the edges of the strip. This permits a subsequent grinding operation to remove the outer edges of the strip when bent into a circular form and thus define a series of separated segments at opposite edges of the strip, without resorting to cutting the relatively smaller openings 10 and 11.

Another important advantage obtained by the method described is the thinning of the spaced-apart edges relative to intermediate portions of the ring, including the connecting portions 4. Exceedingly thin edges may be desired for oil metering purposes, with relatively thicker supporting ring portions occurring adjacent to these thin edges.

The step of forming the web portions so that they are of a radial thickness greater than their circumferential thickness further imparts rigidity to the ring with respect to forces tending to move the spaced-apart edges toward one another in a direction axially of the ring. At the same time, the spaces between the connecting portions are relatively increased in circumferential width, which permits increased oil passage area and reduces carbon formation.

The method of forming relatively thin edges in a ring of this general U-shaped character may be desired to be carried out in other ways, as for example by rolling the edges and then immediately cutting them by overlapping slots to define separated segments. Also, the thinning of the webs may be carried out independently of other forming operations and other changes resorted to.

It will be observed that the method of the invention provides a piston ring structure having overlapping slots which define movable segments, with the slots being obtained without extending cutting operations through the edges of the strip. A method of imparting rigidity and increased oil passageways has also been disclosed and other desirable features introduced.

While I have shown a preferred embodiment of the invention, it should be understood that various changes may be resorted to, in keeping with the spirit of the invention as defined by the appended claims.

I claim:

1. That improvement in methods of making piston rings which comprises providing a strip of resilient sheet metal, cutting slots which extend transversely of the strip within the edges thereof in spaced-apart relation, said slots being of substantially the same length and the ends of alternate slots being offset transversely, applying pressure along portions of the strip occurring between outer edges thereof and the extremities of respective innermost slots to flow the sides of the outermost slots toward one another throughout a part of the length of the slots, thereby forming interstices which are of less width than the slots, longitudinally bending the strip along lines of bending which intersect portions of the strip between the slots to provide a substantially U-shaped member, bending the U-shaped member into a ring body in which edges of the strip occur at the outer periphery thereof, and grinding the outer edges of the ring body to remove portions of the ring body located between its outer peripheral edges and the outer extremities of the said interstices, thereby to provide a flexible piston ring made up of circumferentially spaced apart segments and connecting portions for the segments.

2. That improvement in methods of making piston rings which comprises punching a strip of metal piston ring material to remove part of the piston ring material and thereby form transversely extending spaced-apart slots which terminate within the edges of the strip, the ends of alternate slots being offset transversely, applying pressure along the strip to force together the metal at the sides which form outermost slots and thereby provide relatively smaller slots, longitudinally bending the strip to arrange those portions at one side of the strip which include relatively smaller slots in parallel relation to those portions of the strip which include relatively smaller slots at an opposite side of the strip, bending the strip into a split ring body in which the edges of the strip occur at the outer periphery thereof, and then removing portions of the split ring body which occur between its outer peripheral edges and the outer extremities of the relatively smaller slots.

3. That improvement in methods of making piston rings which comprises removing parts of a strip of piston ring material to provide transversely disposed spaced apart cuts which terminate within the edges of the strip of resilient piston ring material, the ends of alternate cuts being offset transversely, applying pressure to opposite edges of the strip for the purpose of thinning the edges and partially closing the cuts throughout a part of their length, bending the strip longitudinally of itself to arrange in parallel relation those portions of the strip which include the said offset ends of the cuts at either side thereof, bending the strip into a split ring body in which edges of the strip occur at the outer periphery of the ring body, then removing portions of the ring body occurring between its outer peripheral edges and the extremities of those cuts which extend radially outward the greatest distance, thereby to provide a flexible piston ring made up of annular rows of separated segments and connecting portions for the segments.

4. That improvement in methods of making piston rings which comprises cutting away parts of a strip of piston ring material to provide transversely disposed spaced apart slots which terminate with the edges of the strip of piston ring material, the ends of alternate slots being offset transversely, applying pressure to edges of the strip to flow the material of the strip and partially close the slots for a part of their length, bending the strip longitudinally to arrange in parallel relation those portions of the strip which include said offset ends of the slots at either side thereof, bending the strip into a split ring body in which edges of the strip occur at the outer periphery of the ring body, then grinding to remove portions of the ring body between the outer peripheral edges and the extremities of those slots which extend radially outward the greatest distance.

5. That improvement in methods of making piston rings which comprises cutting away parts of a strip of piston ring material to provide transversely disposed spaced apart slits which terminate within the edges of the strip of resilient piston ring material, the ends of alternate slits being offset transversely, applying pressure to edges of the strip to flow the material of the strip and partially close the slots for a part of their length, bending the strip longitudinally to provide a substantially U-shaped member, bending the strip into a split ring body in which edges of the strip occur at the outer periphery thereof, and removing portions of the split ring body occurring between its edges and the extremities of those slits which extend radially outward the greatest distance, thereby to provide a flexible piston ring made up of annular rows of separated segments and connecting portions for the segments.

6. That improvement in methods of making piston rings which comprises cutting away parts of a strip of piston ring material to provide transversely disposed spaced apart slots which terminate within the edges of the strip of resilient piston ring material, the ends of alternate slots being offset transversely along either side of the strip, applying pressure to either side of the strip along those portions which occur between edges of the strip and extremities of innermost slots thereby to decrease the width of the outermost slots for a part of their length, bending the strip longitudinally of itself to provide a substantially U-shaped member, bending the U-shaped member into a split ring body in which edges of the strip occur at the outer periphery thereof, then removing portions of the ring body between its outer peripheral edges and the outer extremities of those slots of decreased width to provide a flexible piston ring made up of annular rows of separated segments and connecting portions for the segments.

7. That improvement in methods of making piston rings which comprises cutting transversely disposed spaced apart slots in a strip of resilient piston ring material, the ends of alternate slots being offset transversely and terminating within edges of the strip, applying pressure to either side of the strip along those portions which occur between edges of the strip and extremities of innermost slots, thereby to provide relatively thin edge portions in the strip and a relatively thick intermediate portion between the edges of the strip, bending the strip longitudinally of itself along lines of folding which extend throughout the relatively thick intermediate portion of the strip, bending the strip into a split ring body in which edges of the strip occur at the outer periphery thereof, then removing portions of the ring body between its outer peripheral edges and the outer extremities of those slots which extend radially outward the greatest distance to provide a flexible piston ring made up of annular rows of circumferentially spaced apart segments and connecting portions for the segments.

THOMAS A. BOWERS.